Oct. 1, 1935.  E. IRVING  2,016,203

CARRIER FOR PNEUMATIC TUBE SYSTEMS

Filed July 8, 1932

*INVENTOR*
ELLERY IRVING

Eugene C. Brown
*ATTORNEY*

Patented Oct. 1, 1935

2,016,203

UNITED STATES PATENT OFFICE 2,016,203

CARRIER FOR PNEUMATIC TUBE SYSTEMS

Ellery Irving, East Orange, N. J., assignor to The Western Union Telegraph Company, New York, N. Y., a corporation of New York Application July 8, 1932, Serial No. 621,453

5 Claims. (Cl. 243—35)

This invention relates to carriers for pneumatic dispatch tubes and more particularly to a wearing head for such carriers.

While the invention is applicable to carriers for cash, memoranda, etc. in store service systems, it is especially useful in pneumatic tube systems used for transporting telegrams, in which the carrier speeds are high and the hauls are long, being, in some cases, as much as a mile or more.

Such carriers, as heretofore constructed, have been formed of a tubular body of fibre, metal or other rigid material having a cushioned head consisting of a block or disc of felt or a similar substance. This head constitutes the packing or bearing surface of the carrier within the tube so as to insure the building up of air pressure behind the carrier or of a vacuous condition ahead of it, by preventing leakage of air past the carrier. While felt heads, when new, effectively seal the tube, they create considerable friction with the walls of the tube and thereby restrict the free passage of the carrier therethrough, consequently reducing the speed thereof.

The walls of the enclosing tube usually have an appreciable film of oil and moisture thereon, which, due to the extremely porous nature of the felt, is rapidly absorbed thereby, causing swelling of the head and thereby interfering with the proper passage of the carrier through the tube. The heads may increase in thickness as much as fifty percent due to absorption of moisture and oil. This swelling reduces the compactness and strength of the felt and is a source of continuous annoyance in the operation of pneumatic dispatch systems.

The felt heads, moreover, wear rapidly and after a short time lose their effectiveness for sealing the tube. Consequently, they have to be replaced at frequent intervals. Since the felt heads are cut from solid blocks of compressed felt of high quality, they are relatively expensive and the operation of frequently renewing the head is troublesome and costly. Furthermore, during a large period of the use of each carrier it is not operating at maximum speed due to leakage past the head.

Among the objects of the present invention are, to increase the speed of the carrier through the tube or to enable the same speed to be maintained at a somewhat lower air pressure; to reduce the wear on the heads; to facilitate the even wearing of the head; and to produce a carrier head which is cheap, durable and readily replaceable and which may be applied readily to carriers of the prior art type.

With the above and other objects in view the invention will be described in detail, reference being had to the accompanying drawing in which.

The form of carrier used heretofore for conveying telegrams from one part of a building to another or from one building to another, is shown in patent to Needham No. 1,176,918, granted March 28, 1916. With the exception of the present improvement in the head, this is the type of carrier shown in the accompanying drawing.

Figure 1:
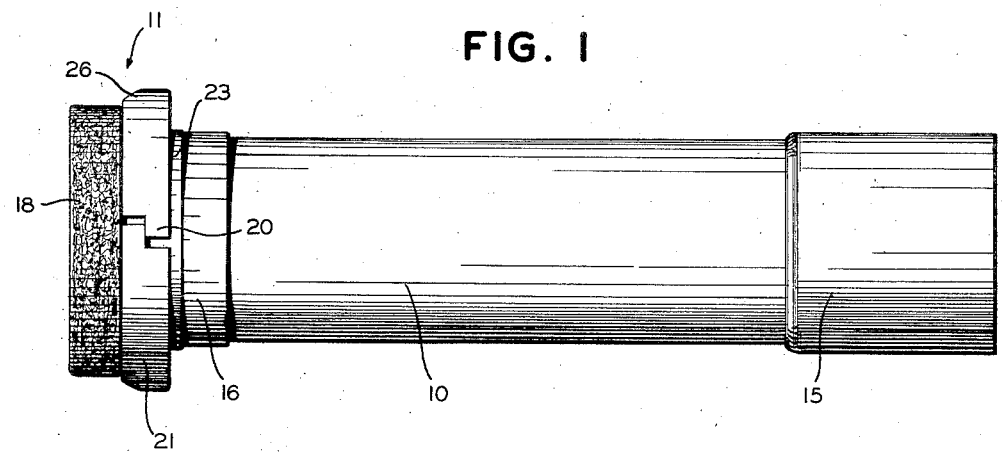
Figure 1 is a side elevation of a carrier embodying the present invention.

Referring first to Figure 1 of the drawing, 10 designates the carrier body which consists of a tube of hard fibre or other suitable material, open at one end and provided at its other end with a sealing head generally indicated by the numeral 11. To the inner side of the carrier and extending longitudinally thereof is a tube or channel 12 forming a holder for the long stem or rod 13 of the message holding clip 14. The open end of the carrier is provided with a reinforcing ring 15 and the opposite end of the carrier body is closed by a metallic cup 16. When it is desired to insert message clips in the carrier, the clip 14 is withdrawn beyond the open end of the carrier, compressing the spring 17 and after the message has been inserted the clip is released to assume the position within the carrier shown in Figure 2.

A buffer 18 of felt, rubber, or similar material, is secured to the metal cup 16, as by rivets 19, and serves to absorb the shock when the carrier reaches its destination. In carriers of this type as heretofore used, the felt buffer has been of a size to fit snugly within the pneumatic tube so as to form a head for sealing the tube against leakage of air past the carrier. As stated the felt head when so used creates considerable friction with the tube and quickly wears down allowing leakage past the carrier and thereby decreasing the carrier's speed. Due to the location of the stem 13 of the message clip in the tube or channel 12 the carrier is unbalanced and normally assumes a position, during travel, with the channel 12 lowermost and consequently the wear on the carrier head occurs chiefly on this lower side. As the wear continues, the lower side of the felt head gradually assumes the curvature of the tube thereby increasing the area of contact and thus the friction. At the same time the clearance above the carrier increases, permitting leakage of air past the carrier. These two effects act to reduce the carrier speed.

In accordance with the present invention the buffer 18 is made of a diameter materially less than that of the tube through which it must pass and an additional wearing head 21 is provided just back of the buffer. This wearing head is formed of a hard, wear-resisting material having a small coefficient of friction with the enclosing tube. Types of material which have been found particularly suitable are hard fibre, micarta, bakelite, metal, etc., although it is to be understood that numerous other suitable materials are available.

Figure 2:
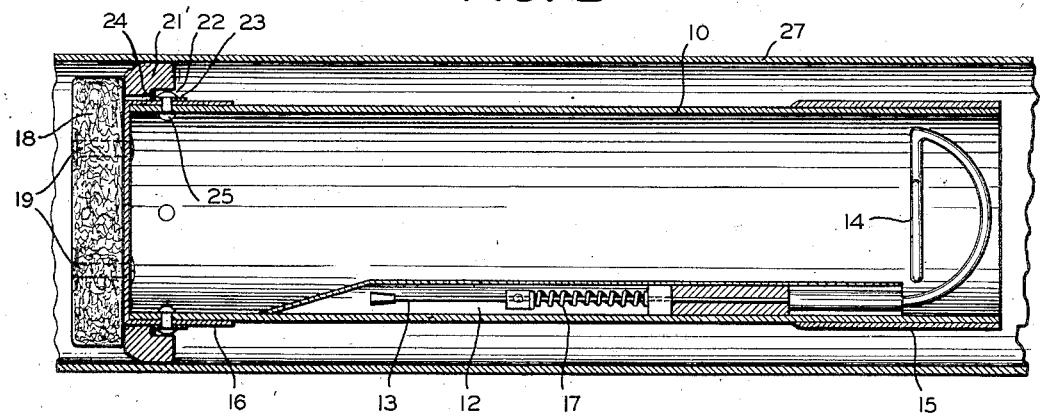
Figure 2 is a sectional view of a carrier having a modified form of wearing head, showing the relation of the carrier to the enclosing tube.
Figure 3:
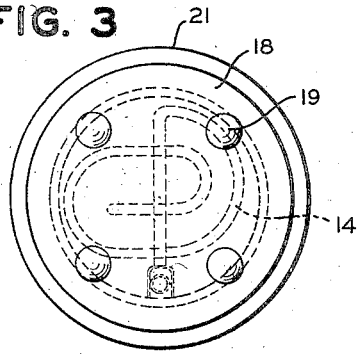
Figure 3 is an end view as seen from the left side of Figure 1.

As shown in Figure 1, the head 21 comprises a split ring having interlocking ends 20 fitting around the cup 16 but free to turn thereon. In Figure 2 the ring 21' is solid but of slightly larger internal diameter than the cup 16 so as to provide limited clearance around the cup. The ring has annular recesses 22 therein, the radial wall of which abuts against a retaining ring 23, preferably of metal, having an outwardly extending flange 24. The ring 23 is secured to the carrier by rivets 25 or in any other suitable manner. The felt buffer 18 engages the forward face of the ring and retains it in position on the carrier.

The head 21 is of such diameter as to freely pass through the pneumatic tube system while at the same time completely closing the tube and preventing air leakage past the carrier. Due to the hard nature of the material used the head can be moulded, stamped or turned down accurately to the proper size. The fibre head has a low coefficient of friction with the metal tube through which it passes and by virtue of this an increase in the rate of travel through the tube of from ten to twenty percent over that obtained with the carriers having felt heads, is secured. Due to the slow-wearing quality of the head and the fact that its size and surface characteristics are not altered by absorption of oil or moisture from the walls of the tube, the close clearance with the tube is maintained over long periods. The wear moreover is distributed substantially uniformly around the entire head since the position of the head relative to the lower side of the carrier is variable. Consequently the head does not tend to wear to the arc of the tube, that is to an out-of-round condition as is the case with the usual types of felt heads.

A feature of importance with the present invention is that it may be applied to existing carriers of the prior art type. For instance when it becomes necessary to renew the felt head of carriers of the type shown in the Needham patent, the heads are removed by knocking out the securing rivets and a new head reriveted thereon. In applying the present invention to such carriers it is only necessary after the original felt heads have been removed, to apply the ring 23 over the cup 16, rivet or weld it in place, slip on the head 21 and after cutting the worn buffer head to the correct diameter and thickness, to secure it back in place. The expense of the rings 21 and 23 is less than the cost of new felt heads. Consequently the existing carriers can be equipped in accordance with the present invention at no additional expense over that required to replace the original felt heads.

In order to prevent chipping or breaking of the head due to sudden impact thereof with projections or obstructions in the tube, such as dents, misalignment of valve openings at junction points, etc., I prefer to bevel the forward end of the head slightly as shown at 26.

The overlapped end portions 20 of the head 21 are sprung apart slightly thereby permitting the ring to contract as the inclined portion 26 engages a slight obstruction or out-of-round condition of the tube.

A similar result is obtained with the head 21', of Figure 2, due to the deformation of the head into an oval shape as an obstruction or oval section of the tube is passed. This deformation is rendered possible because of the slight clearance left between ring 21' and the cup 16. The heads 21 or 21' therefore are caused to conform somewhat to the shape of the particular section of the tube through which the carrier is passing.

Figure 4:
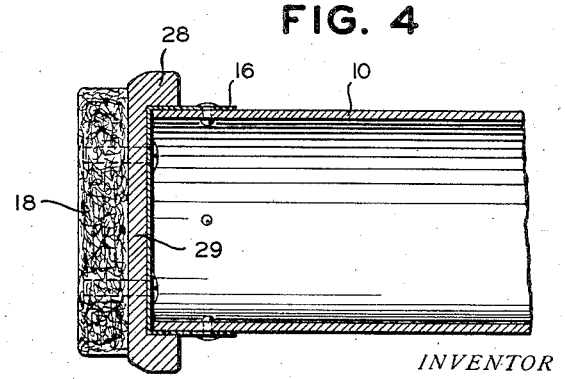
Figure 4 is a fragmentary sectional view of a carrier having a modified form of head.

In Figure 4 I have shown a modification in which the wearing head 28 is rigid on the body of the carrier. This type has the advantage of being somewhat cheaper than the form previously described. Preferably it is used where the carrier is not unbalanced. The head 28 has a central web 29 by which it is secured to the cup 16 by the same rivets used to hold the buffer 18 in place.

It is obvious that the invention may be embodied in various other forms and may be applied to other types of carriers. Therefore I do not desire to be restricted to the details shown but contemplate all such changes as come within the scope of the appended claims.

What I claim is:

1. A carrier for a pneumatic tube dispatch system, comprising a tubular body of a diameter materially less than that of the tube through which the carrier must pass, and a split ring surrounding a portion of said tubular body and forming a head for closing the tube against air leakage past the carrier, the ends of said ring being spaced apart, whereby the ring may be contracted to conform to variations in the minimum diameter of said tube.

2. In a pneumatic carrier dispatch system, a carrier tube which may embody slight ovalities, a carrier having a tubular body of a less diameter than said carrier tube, a normally circular ring of relatively hard non-compressible material having a low coefficient of friction with the walls of said tube disposed to surround a portion of said tubular body and forming a head for closing said tube against air leakage past the carrier, substantial clearance being provided between said ring and tubular body, said ring having substantial diametrical springiness whereby the same may be deformed to assume ovalities conforming with the ovalities of the carrier tube.

3. In a pneumatic carried dispatch system, a carrier tube which may embody slight ovalities, a carrier having a tubular body of a less diameter than said carrier tube, a normally circular ring of relatively hard non-compressible material, having a low coefficient of friction with the walls of said tube disposed to surround a portion of said tubular body and forming a head for closing said tube against air leakage past the carrier, substantial clearance being provided between said ring and tubular body, said ring having a relatively small radial thickness whereby it may be deformed diametrically from its normal circular shape to conform to the ovalities of the tube.

4. In a pneumatic carrier dispatch system, a carrier tube which may embody slight ovalities or other irregularities in its inner surface, a carrier having a tubular body of less diameter than said carrier tube, a normally circular ring of a relatively non-compressible material having a low coefficient of friction with the walls of the tube forming a head to closely fit the interior wall of said carrier tube, a groove for receiving said ring disposed to surround said tubular body adjacent one end thereof, substantial radial clearance being provided between the inner surface of said ring and the bottom of said groove, said ring being formed sufficiently thin to yield by arcuate bending to the slight ovalities or irregularities of the inner surface of said tube.

5. In a pneumatic carrier dispatch system, a carrier tube certain sections of which may embody irregularities characterized by a shortening along one or more diameters, a carrier having a tubular body of less diameter than said carrier tube, a ring of relatively hard, non-compressible material having a low coefficient of friction with the walls of said tube disposed to surround a portion of said tubular body, and forming a head for closing said tube against air leakage past the carrier, substantial clearance being provided between said ring and tubular body, said ring being distortable diametrically, whereby the same may assume a shape shortened along one or more of its diameters when it engages the irregular sections of the tube.

ELLERY IRVING.